Aug. 24, 1937. W. W. SLOANE 2,090,707
MINE LOCOMOTIVE
Original Filed June 6, 1932 4 Sheets-Sheet 1

Inventor
William W. Sloane
Clarence F. Poole
Attorney

Patented Aug. 24, 1937

2,090,707

UNITED STATES PATENT OFFICE 2,090,707

MINE LOCOMOTIVE

William W. Sloane, Chicago, Ill., assignor to Goodman Manufacturing Company, Chicago, Ill., a corporation of Illinois Application June 6, 1932, Serial No. 615,557
Renewed December 24, 1936

29 Claims. (Cl. 242—91)

This invention relates to improvements in mine locomotives and more particularly to mine locomotives of the gathering type wherein power is transmitted to the locomotive motors when beyond the trolley line by means of a flexible conductor adapted to be reeled on or unreeled from a cable reel.

This invention has, among other objects, to provide a safe and economical means of a novel construction for conducting power to the locomotive when remote from the trolley line or other source of power, which is constructed with a view towards compactness, general all around efficiency, utmost safety in operation in mines which are dangerous on account of gas therein, and so arranged that a uniform tension is exerted on the conductors at all times during reeling in or paying out thereof.

While the usual practice is to provide gathering locomotives with a double conductor flexible cable wound on a single cable reel, or a single conductor cable employing the mine rail for the return, the practice has recently been developed of insulating the electrical parts of the locomotive from the locomotive frame and rail when obtaining power from the cable reel and providing a plurality of single conductor cables insulated from each other and wound upon separate cable reels. Such an arrangement eliminates sparking between the wheels and rails and minimizes the danger of arcing when one or the other of the cables has been severed. While the device of my invention may be applied to a reel for winding on a single or double conductor cable, it is particularly adapted for use in cases where two single conductor cables are provided and each single conductor cable is wound upon an independent cable reel.

In cases where two single conductor cables have been provided, many difficulties have been encountered; namely, those caused by the fact that one or the other cable is liable to be fouled on mine ties or rails, or other obstacles on the mine floor, causing one or the other cable to break or causing one or the other cable reel drum to get out of step of the other drum.

Other difficulties encountered are due to the fact that a mine locomotive must be constructed so as to be capable of traveling in coal mines where the head room is restricted. Due to the difficulties of providing two cable reel drums capable of carrying sufficient cable to permit the locomotive to travel a distance away from the source of power sufficient to effectively perform the gathering operation in this restricted space, it has been found that the most practical arrangement of the drums is to arrange said drums for rotation about a vertical axis, one drum being disposed above the other so the level of the top portion of the top drum is even with the deck of the locomotive.

It has further been found that, in order to arrange these drums so as to take up a minimum amount of vertical space and carry a maximum amount of cable, these drums must necessarily be deep and of a narrow width. When the drums are so arranged, the power required to wind in the cable when cable is fully wound on the drum is greater than when said cable is partially wound thereon and vice versa when unwinding, and this power varies as the amount of the cable on the drum progressively increases or decreases. The device of my invention is so arranged that the torque on the motor for driving the drums varies according to the amount of cable thereon and thus causes the tension on the cables themselves to be substantially uniform while being wound on the drum or unwound therefrom when the drum is full or empty.

The device of my invention is also so arranged that the motor for driving the cable reel drums serves to effect tension in the cables while being unwound from their respective cable reel drums or while the locomotive is standing in a stationary position on the mine track, the ends of the cables being attached to the source of power supply, said motor being so arranged that the torque thereof is substantially constant both while winding, unwinding, or stalling for any given amount of cable on the cable reel drums.

Other objects of my invention will appear from time to time as the following specification proceeds.

My invention may be more clearly understood with reference to the accompanying drawings wherein.

Like numerals refer to like parts throughout the various figures.

Referring now in particular to the details of the drawings, the embodiment of my invention illustrated comprises an electric mine locomotive 10 which includes a main frame 11 supported on track wheels 12, 12 and axles 13. The track wheels 12, 12 are driven by means of suitable electric motors of an ordinary construction, indicated by reference character 14, and power may be transmitted to said motors by means of the ordinary trolley line and rails through a trolley pole (not shown), or by means of flexible cables 15 and 16 adapted to be wound on suitable cable reel drums, indicated by reference characters 17 and 18, respectively.

Figure 1:
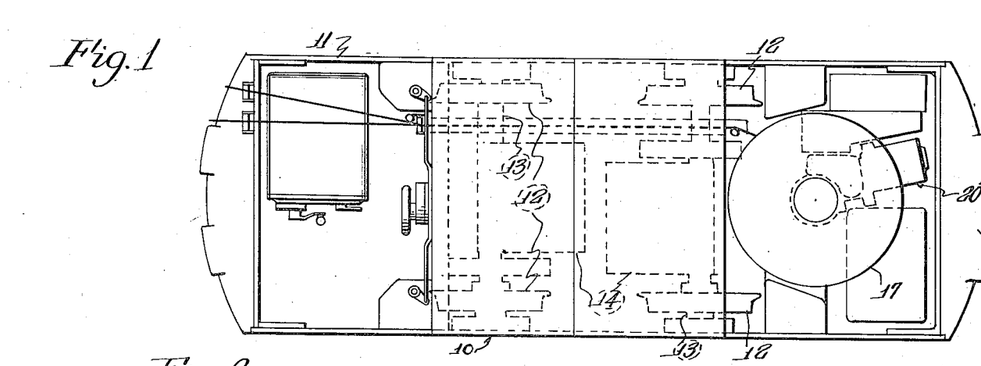
Figure 1 is a partial diagrammatic top plan view of a gathering locomotive illustrating one form in which my invention may be embodied.
Figure 2:
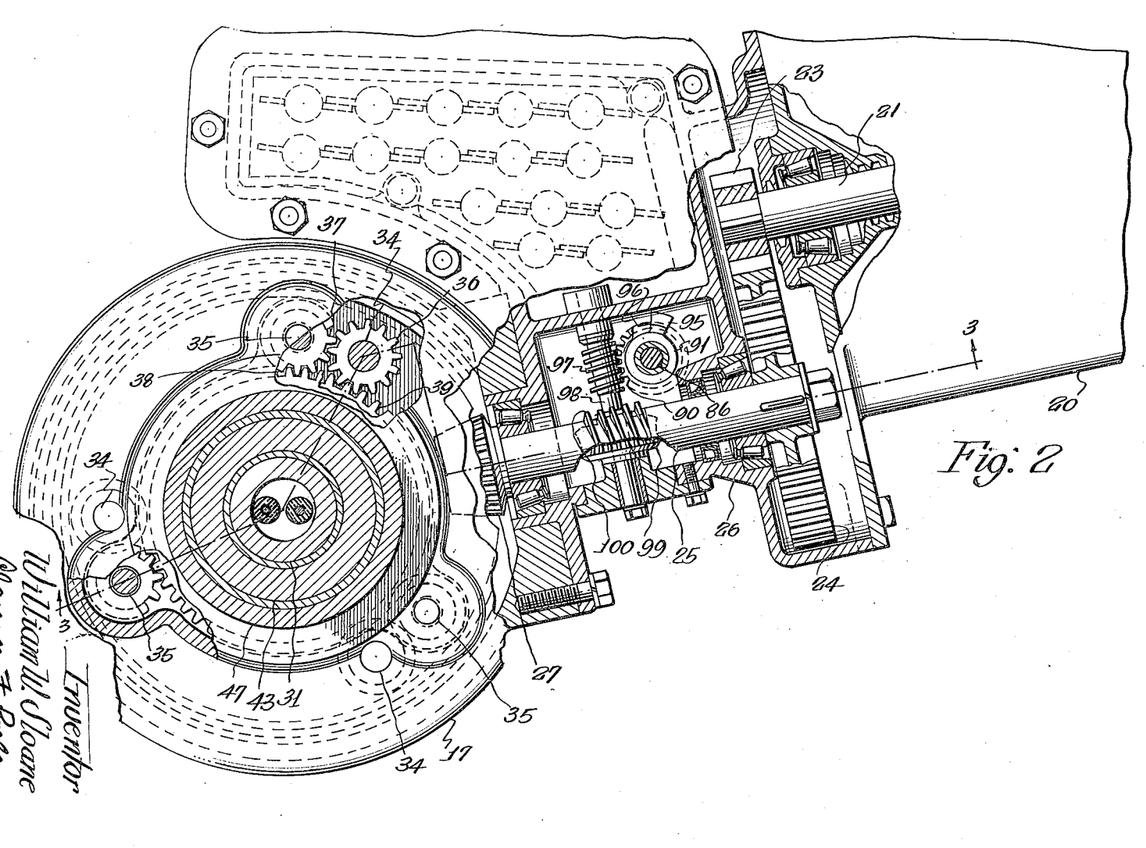
Figure 2 is an enlarged detail plan view of the cable reel mechanism with parts broken away and in section to more clearly show the details of my invention.
Figure 3:
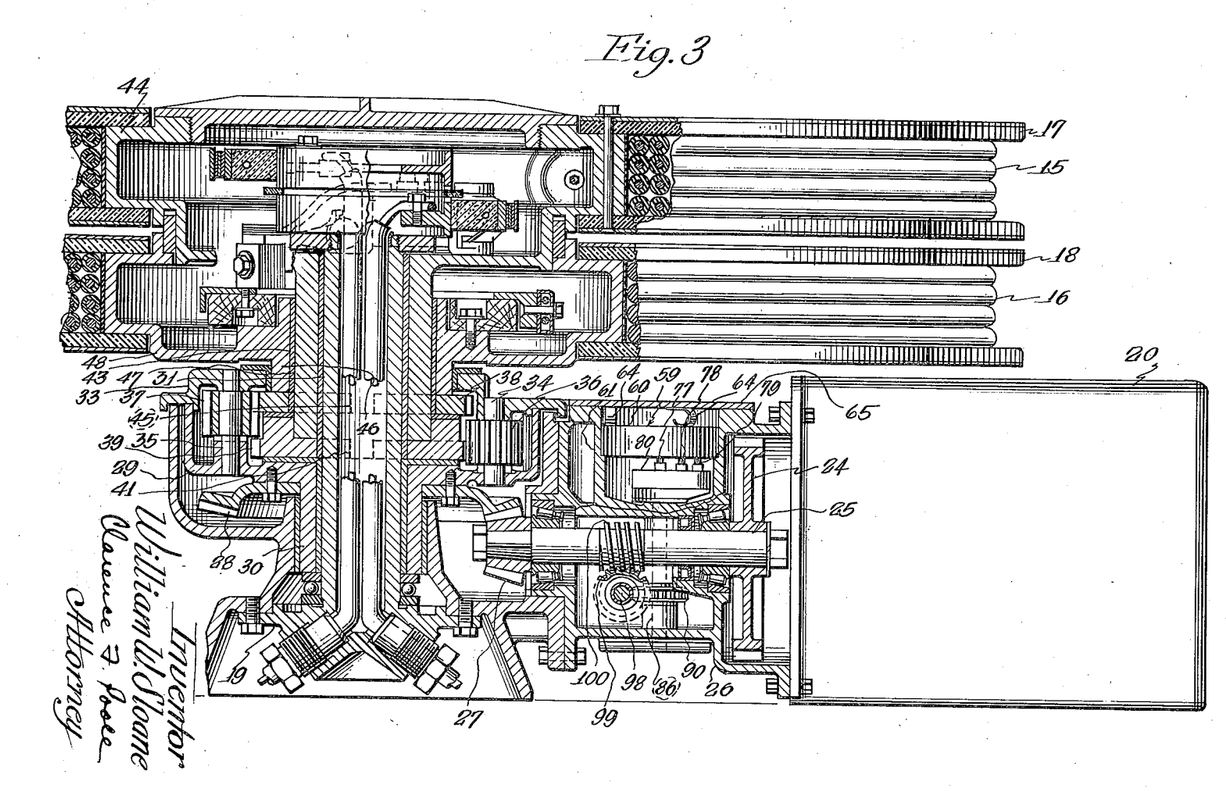
Figure 3 is a partial enlarged fragmentary sectional view taken substantially on line 3—3 of Figure 2.
Figures 4, 5, 6, 7:
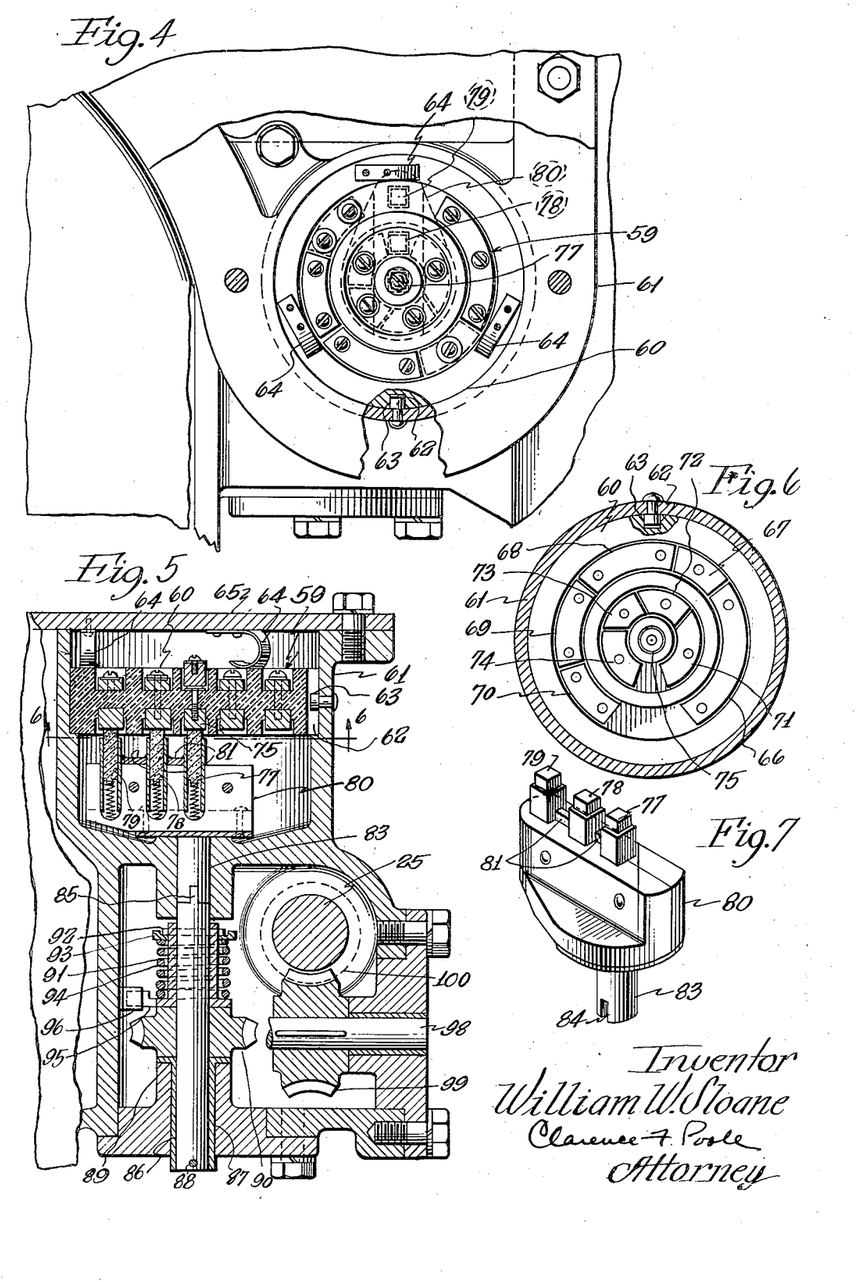
Figure 4 is an enlarged detail view of a device for cutting a resistance into or out of the circuit for driving the cable reeling mechanism.
Figure 5 is an enlarged vertical sectional view of the device shown in Figure 4 illustrating certain details of the mechanism for cutting a resistance into or out of the circuit for the cable reeling mechanism not clearly shown in Figure 4.
Figure 6 is a sectional view taken substantially along line 6—6 of Figure 5.
Figure 7 is an enlarged detail perspective view illustrating certain details of the mechanism for cutting a resistance into or out of the cable reeling mechanism, not shown in Figures 4 and 5.

Referring now in particular to Figures 1, 2, and 3, and the details of the cable reel drums 17 and 18, it may be seen that said cable reel drums are disposed one above the other and are rotatable about a vertical axis adjacent the rearward end of the locomotive so the flexible cables 15 and 16 may be paid off from either the forward or rearward ends of said locomotive. The cable reel drums 17 and 18 are each of a similar construction and comprise flanges secured to a central hub and insulated therefrom to form an insulated reel or winding drum for each cable and are supported on a suitable supporting frame, indicated by reference character 19, for rotation with respect thereto.

The cable reel drums 17 and 18 are driven by means of a suitable electric motor, indicated by reference character 20, the details of which will hereinafter be more fully described as this specification proceeds. The motor 20 is provided with an armature shaft 21 having an armature pinion 23 keyed thereon, which armature pinion meshes with and drives a spur gear 24 keyed on a horizontal shaft 25. The horizontal shaft 25 is journaled in a suitable frame member 26 in a usual manner and has a bevel pinion 27 keyed on its end opposite from the spur gear 24. The bevel pinion 27 meshes with and drives a bevel gear 28 secured to the under portion of a casing 29, by means of suitable cap screws in a usual manner, for driving said casing.

The casing 29 is provided with a depending hub 30, which hub is journaled on an upstanding cylindrical portion 31 of the supporting frame 19 for rotation with respect thereto, the inner portion of said upstanding cylindrical portion serving to enclose suitable conductors leading from the cables on the cable reel drums 17 and 18 to the locomotive circuit proper, but not herein described in detail since it is no portion of my invention. An annular member 33 is secured to the top portion of the casing 29 for rotation therewith and provides a cover for said casing and a means for supporting the upper ends of a plurality of spaced vertically extending shafts, indicated by reference characters 34 and 35, respectively. The lower ends of the vertically extending shafts 34 and 35 are supported in the casing 29 in a suitable manner.

The shafts 34 and 35 are arranged in pairs so one shaft 34 is adjacent one shaft 35 and are spaced along the casing 29 on equal radii at suitable intervals so a spur pinion 36, supported on the shaft 34, may mesh with a spur pinion 37 supported on the shaft 35. Each spur pinion 37 is arranged so a portion of its face meshes with a portion of the face of the spur pinion 36 and so a portion of its face is disposed above the spur pinions 36 and so the upper portion of said spur pinion may mesh with the teeth of a spur gear 38. Likewise, each spur pinion 36 is arranged so a portion of its face is disposed beneath the spur pinions 37 so the lower portion of the spur pinion 36 may mesh with the teeth of a spur gear 39 coaxial with and disposed beneath the spur gear 38.

The spur gear 39 is journaled for rotation about the upstanding cylindrical portion 31 of the supporting frame 19 and is provided with a plurality of radial slots therein for receiving jaws 41 depending from a sleeve member 43 integral with and depending from a hub member 44 for the cable reel drum 17. In a similar manner the lower face of the spur gear 38 has bearing engagement with a suitable bearing member which rests on a top face of a hub portion integral with the spur gear 39 and said spur gear is journaled for rotation about the sleeve member 43 and is provided with a plurality of radial slots therein which are adapted to receive jaws 45 depending from a sleeve member 46 integral with and depending from a hub member 47 for the cable reel drum 18. The sleeve member 46 is journaled on the outer periphery of the sleeve member 43 for rotation with respect thereto and its outer periphery is journaled within the annular member 33 for rotation with respect thereto.

When the bevel gear 28 is driven from the motor 20, the casing 29 and annular member 33 are driven thereby. This will cause the shafts 34 and 35 and their respective pinions 36 and 37 to move in an annular path about the axis of the bevel gear 28, which in turn will rotate the spur gears 38 and 39 and drive the cable reel drums 17 and 18 in an obvious manner. When rotation of one or the other drum is stopped, the pinions connected with said drum will drive the pinions meshing therewith and speed up rotation of the opposite drum and vice versa.

It may thus be seen that the drive is such that it forms in effect a differential drive for the cable reel drums 17 and 18 so said drums may be simultaneously driven from the motor 20, and so one drum may compensate for variations in speed of the other due to fouled cable or the fact that the cable is being drawn off of one drum at a higher rate of speed than the other drum.

Thus when the cables 15 and 16 are attached to the source of power, such as a trolley line and mine rail or bond, and as the locomotive moves away from the source of power, the cable reel drums 17 and 18 drive the bevel gear 28 and motor 20. The motor 20 is constructed in such a manner that it may drive the drum 17 or 18, or be driven thereby, without being disconnected from the source of power. Thus the motor 20 serves to retard rotation of the cable reel drums 17 and 18 as the locomotive is traveling and cable is being withdrawn therefrom and drives said cable reel drums the instant the locomotive stops or travels towards its source of power so that the cables 15 and 16 are in tension at all times when connected to the source of power. This prevents said cables from being run over by the locomotive in cases where the locomotive is traveling up or down grades and there is slippage between the locomotive wheels and rails, and in cases where the locomotive has a tendency to run away, as where it is traveling under a relatively light load.

It should be noted that due to the differential drive for the cable reel drums 17 and 18, and due to the fact that there is a tendency for the motor 20 to wind in said cable reel drums whenever current is applied to said motor, that cable cannot unwind from said drums at a greater rate of speed than the speed of travel of the locomotive and that due to the differential drive from said motor to said drums, one drum will compensate for variations in speeds of the other drum to permit a greater amount of cable to be paid off from one drum than the other, as where the one cable must travel around obstacles while the other cable travels in a relatively straight line, and that said differential drive makes it possible for the speeds of rotation of said drums to so compensate for each other that each drum may be fully wound or unwound simultaneously with the other drum.

Figure 8:
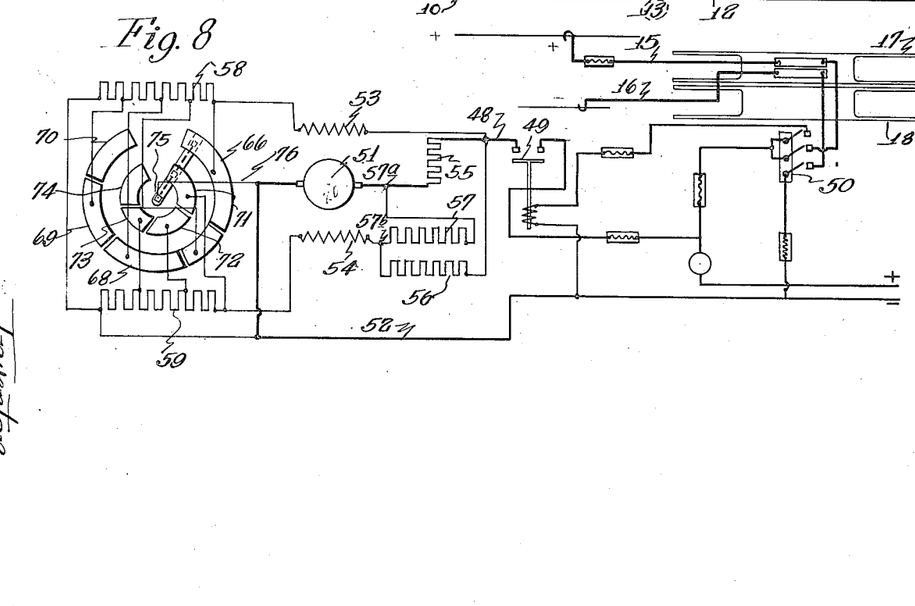
Figure 8 is a schematic wiring diagram of the electrical connections for the parts embodying my invention.

Referring now in particular to the motor 20 and electrical circuit therefor, and several other of the novel features of my invention, a positive conductor 48 is provided (see Fig. 8). The positive conductor 48 is connected to a source of power supply, herein shown as being a trolley line, by means of a circuit breaker 49, a suitable switch indicated by reference character 50, suitable electrical conductors provided within the cable reel drum 17 and support therefor, the flexible cable 15 and a suitable connector adapted to be hooked on a positive conductor connected with the source of power in a usual manner, said positive conductor herein preferably shown as being a trolley line.

The motor 20 is of the shunt wound type and comprises an armature 51 connected from the positive conductor 48 to a negative conductor 52, a shunt field 53, and compensating field 54. The negative conductor 52 is in turn connected to the return or ground by means of the switch 50, suitable conductors carried within the cable reel drum 18 and support therefor and the flexible cable 16. Suitable resistances are connected in the motor circuit which will hereinafter be more fully described.

Inasmuch as the drive connection from the motor 20 to the cable reel drums 17 and 18 is a direct drive connection with no intermediate friction or clutch means interposed therein, and inasmuch as no means is provided on the locomotive to reverse the direction of the motor 20 when cable is being unreeled from the respective cable reel drums 17 and 18, it may be seen that tension is maintained in the cables 15 and 16 when the locomotive is standing in a stationary position on the track by means of the motor 20 which is in a stalled position. As the locomotive approaches the source of power supply, the motor 20 drives the cable reel drums 17 and 18, and as the locomotive leaves the source of power supply the motor 20 is driven by said cable reel drums, said motor then operating as a generator in series with the line. It is thus apparent that the motor 20 maintains tension on the cables 15 and 16 at all times when electric power is applied thereto. In order to maintain the drive to its utmost efficiency and minimize the possibilities of said locomotive running over either of the cables 15 or 16, it is necessary that said cables be continually in tension and that said tension be substantially uniform during winding, unwinding, or stalling.

Suitable means are provided for effecting a substantially constant torque on the shaft 21 of the armature 51 when said armature is stalled or operates as a motor or as a generator for a certain given amount of cable on the cable reel drums 17 and 18.

It should be understood that by constant torque on the shaft 21 of the armature 51 is meant constant torque when the motor 20 is stalled or operates as a motor or as a generator for any given amount of cable on the cable reel drums 17 and 18 and not constant torque at all times during the winding and unwinding operations, since in order that the cable tension remain substantially uniform during the entire winding and unwinding operations the torque must vary as the cable reel drums become full or empty. Said means includes the compensating field 54, a resistance 55 connected in series with the armature 51 and positive conductor 48, a resistance 56 connected in series with the compensating field 54 and positive conductor 48, and a resistance 57 bridged from a point 57$^a$ in the circuit for the armature 51 to a point 57$^b$ in the circuit for the compensating field 54 on the positive side thereof.

Inasmuch as the difference in potential between the point of connection of the resistance 57 to the compensating field 54, indicated by reference character 57$^b$, is higher than at the point of connection of said resistance to the circuit for the armature 51, indicated by reference character 57$^a$, current will flow through said resistance to the armature circuit and is added to the current in said armature circuit coming through the resistance 55. As the speed of the motor 20 increases, the counter E. M. F. generated by the armature 51 increases, and the current in said armature decreases. The difference in potential between the points 57$^a$ and 57$^b$ is reduced so that less current flows through the point 57$^a$ to the armature and more current flows through the compensating field 54.

When the motor 20 is operated as a generator, the potential is reversed and the voltage in the armature increases as the speed of the motor 20 increases. The potential at the point 57$^a$ is reduced and more current flows through the point 57$^a$ to the armature and less current flows through the compensating field.

Inasmuch as torque is the measure of the product of the field strength times the armature current, and inasmuch as the armature current varies as the speed of the motor increases or decreases, it may be seen that the function of the compensating field 54 is to compensate for these variations in armature current in such a manner that a relatively small amount of current flowing therethrough in proportion to the current lost by the armature 51 will so increase the strength of said compensating field as to maintain the torque of said armature at the proper value.

It should further be noted that when the speed of the motor 20 increases, and current in the compensating field 54 is increased, current in the armature 51 will be decreased by a greater amount than the increase in current in the compensating field 54 due to losses in the system and the resistance 57. The compensating field 54 must therefore be so designed and be of such sensitiveness that the influence of the small additional amount of current passing therethrough will strengthen said compensating field to such an extent as will offset the decrease of current in the armature 51 and losses to the system and effect a substantially constant torque on said armature for a given amount of cable on each cable reel drum 17 and 18 during stalling or operation of the motor in one direction or another.

When the difference in potential between the points 57ª and 57ᵇ is such that a relatively small amount of current flows through the resistance 57 and armature 51, then a relatively large amount of current will flow through the compensating field 54; and when the difference in potential between the points 57ª and 57ᵇ is such that a relatively large amount of current flows through the resistance 57 and armature, then a relatively small amount of current will flow through the compensating field 54. It may thus be seen that the arrangement is such that the product of the field strength and armature current will remain substantially uniform and that the function of the resistances 56 and 57 is to inherently modify the compensating field strength inversely with the armature current and tend to cause the torque of the armature 51 to be substantially constant when the motor 20 is operating as a motor or generator, or is stalled.

When stalled, current passes directly from the line through the resistance 55 to the armature 51 and through the resistance 56 to the compensating field 54 and through the resistance 57 to said armature. It is thus apparent that the resistance 55 must be of a relatively large capacity compared with the resistances 56 and 57. It should herein be understood that the capacity of a resistance, as herein used, means the wattage that when applied continuously to a resistance will not raise the temperature thereof over a certain predetermined value; as, for example, 250° C., which is a common value for resistances of the porcelain tube type. Thus the function of said resistance is to restrict the amount of current flowing through the armature when stalled to a value which gives the proper torque for the motor 20.

It should be noted that the resistances 55, 56, and 57 are so proportioned, and the strength of the compensating field 54 is such that variations in the product of the field strength and armature current will be reduced to a minimum while the motor 20 is operating as a motor during the winding operation or as a generator during the unwinding operation, or when stalled. One set of electrical values which has been found to be satisfactory for this purpose, is as follows: shunt field 53, 180 ohms; compensating field 54, 28 ohms; resistance 55, 16 ohms; resistance 56, 112 ohms; resistance 57, 20 ohms. The values of resistances 58 and 59 may be varied considerably, as required, but in general their total values should vary approximately in proportion to the resistances of their respective field windings 53 and 54. This provides a means for transmitting a substantially constant torque to the armature shaft 21 for a given amount of cable on the cable reel drums 17 and 18 during the winding operation, the unwinding operation, and during the times when the motor is stalled in instances where the locomotive has stopped and the ends of the cables 15 and 16 are attached to the source of power supply.

Means are further provided to take care of variations in speed and power necessary to wind the cables 15 and 16 on the cable reel drums 17 and 18 at a constant speed and to effect a uniform pull on said cables during the entire winding or unwinding operation, which variations in speed or power are caused by the varying diameters of the cable reel drums as cable is wound on or unwound therefrom. Said means are so arranged that the pull on the cables 15 and 16 is substantially uniform during the winding and unwinding operations. The lesser the amount of cable on either of the drums 17 or 18, the higher the speed of the motor 20 should be in order to wind cable thereon at a uniform speed corresponding to the speed of the locomotive and the less the torque required and vice versa when the drums 17 and 18 are full; as, for example, if the torque of the motor 20 should remain uniform as cable is unwound from the cable reel drums 17 and 18, the tension in said cables would increase.

In order to prevent this increase in tension in the cables and decrease in torque of the motor, I have herein provided an automatic device which will insert a resistance in the shunt field 53 and compensating field 54 after a predetermined amount of cable has been unwound from said cable reel drums. This reduces the motor torque and restores the cable tension to its former value. As unwinding continues, the tension in this cable tends to increase again and at another predetermined point an additional resistance is inserted in the shunt and compensating fields 53 and 54. Resistances are inserted in these fields step by step until all cable has been unwound from the cable reel drums 17 and 18. This effects a substantially constant tension on said cable during the entire unwinding or winding operations.

The means for strengthening or weakening the shunt and compensating fields 53 and 54, respectively, and the resistances hereinbefore mentioned, comprise a resistance 58 connected in series with the shunt field 53 and negative side of the line which may be progressively cut out of or into said shunt field step by step and a resistance 59 connected in series with the compensating field 54 and the negative side of the line which may be progressively cut out of or into said compensating field step by step.

Suitable means are provided for progressively cutting, or as has herein been diagrammatically shown, shorting the resistance 58 out of the circuit for the shunt field 53 step by step and shorting the resistance 59 out of the circuit for the compensating field 54 step by step during the winding operation and cutting said resistances into the shunt field 53 and compensating field 54 step by step during the unwinding operation. Said means may be any hand operated controller or switch of a suitable construction, but is herein preferably shown as being a distributor unit driven from the motor 20 in a manner which will hereinafter be more fully explained.

In order that the motor 20 may be operated at a torque suitable for the varying amounts of cable on the cable reel drums 17 and 18, and in order that the torque values may remain substantially uniform for these conditions when any given amount of cable is on said cable reel drums when the motor is operating as a motor or generator, or is stalled, it is necessary that different ratios exist between the shunt field 53 and compensating field 54 when these fields are adjusted for different torque values. Within certain limits the ratios of one field with respect to the other are not very sensitive so I have herein preferably chosen to vary the strength of these fields alternately rather than simultaneously by cutting in or out the resistances 58 and 59 from the shunt and compensating fields 53 and 54, respectively, alternately. This increases the number of steps of variations in field strength and decreases the tendency for variations of cable tension in each step of strengthening or weakening the fields without any complicated parts or additional apparatus.

Referring now in particular to Figures 4 to 8, inclusive, and the details of the distributing unit, a stationary contact member 60 is provided. The contact member 60 is supported in a suitable casing 61 and is provided with a slot 62 therein which is adapted to be engaged by a suitable stop 63 extending inwardly from one side of said casing. The stationary contact member 60 is yieldably held in the casing 61 by means of spring members 64 attached to the underside of a cover 65 for the casing 61 and abutting the top side of said contact member.

The contact member 60 may be made from any suitable insulating material and is provided with a plurality of flat contacts of an arcuate shape on its undersurface which herein comprise contacts 66, 67, 68, 69, and 70 having a common radius, contacts 71, 72, 73, and 74 spaced closer to the center of said contact member than the contacts 66 to 70, inclusive, and a contact 75 in the center of said contact member. The contacts 66, 67, 68, and 69 have connection with the resistance 58 at progressive stages thereof for progressively cutting said resistance into or out of the shunt field 53. The contacts 71, 72, and 73 have connection with the resistance 59 at progressive stages thereof for progressively cutting the resistance 59 into or out of the compensating field 54. The contact 75 has connection with the negative line by means of a conductor 76.

It should be noted that the contacts 66 to 70, inclusive, and 71 to 74, inclusive, are so arranged with respect to each other that resistance will be alternately cut into or shorted out from the shunt field 53 and compensating field 54, respectively, to take care of the varying ratios of said shunt and compensating fields with respect to each other during winding and unwinding, and increase the number of steps of variation of the field strength and decrease the tendency for variation in cable tension.

Each of the contacts 66 to 75, inclusive, are adapted to be engaged by means of suitable brushes, herein preferably shown as being carbon brushes, and indicated by reference characters 77, 78, and 79, respectively. These brushes are supported in an insulated rotatable arm 80 in a suitable manner and are connected together by suitable bus bars indicated by reference character 81. The brush 77 is disposed adjacent the central portion of the rotatable arm 80 and its top surface is adapted to engage the contact 75. The brush 78 is spaced outwardly from the brush 77 and is adapted to engage any of the contacts 71, 72, 73, or 74 while the brush 79 is spaced outwardly from the brush 78 and is adapted to engage any of the contacts 66, 67, 68, 69, or 70. It may thus be seen that rotation of the arm 80 will cause the brushes 79 and 78 to progressively engage the contacts 66 to 70, inclusive, and 71 to 74, inclusive, respectively, and cut the resistances 58 and 59 out of or into the fields 53 and 54, respectively, to either increase or diminish the strength of said fields during the winding or unwinding operation.

The rotatable arm 80 has a shaft 83 secured to its bottom side and depending therefrom, which shaft is journaled within a bottom portion of the casing 61 for rotatable movement with respect thereto. The shaft 83 is provided with a slot 84 therein, which slot is adapted to be engaged with a projection 85 extending upwardly from and integral with the upper end of a vertical shaft 86. The vertical shaft 86 is journaled adjacent its upper end in a suitable boss integral with the frame member 26 and has a flanged bearing sleeve 87 secured to its lower portion by means of a suitable pin 88. The flanged bearing sleeve 87 is journaled for rotation in an upstanding boss 89 integral with the frame member 26 and the lower portion of its flange abuts the top side of said boss.

A worm gear 90 is freely mounted on the shaft 86 and the lower face of its hub abuts the upper face of the flange of the flanged bearing sleeve 87. The shaft 86 is driven from the worm gear 90 by suitable friction means herein preferably shown as comprising a flanged sleeve 91 mounted on the shaft 86 and having the bottom portion of its flange abutting the upper face of the hub of the worm gear 90. The flanged sleeve 91 is held from rotation with respect to the vertical shaft 86 by means of a pin 92 passing through said shaft and engaging slots (not shown) formed in opposite sides of the upper portion of said flanged sleeve. A collar 93 abuts the underside of the pin 92 and a compression spring 94 is interposed between the underside of the collar 93 and the flange of the flanged sleeve 91. Thus the compression spring 94 engages the flanged face of the flanged sleeve 91 with the face of the hub of the worm gear 90 and provides a friction drive from said worm gear to the shaft 86, the reaction of said compression spring against said shaft being taken by the pin 88 and flange of the flanged bearing sleeve 87 which engages the underside of the hub of said worm gear.

An ear 95 is formed integral with and extends outwardly from the flanged portion of the flanged sleeve 91. A stop 96 is provided on the casing 61 and is adapted to be engaged by the ear 95 (see Figs. 2 and 5). The ear 95 and stop 96 are so arranged as to stop rotation of the rotatable arm 80 when the brush 79 is at the extreme end of the contacts 66 or 70. The speed of rotation of the shaft 86 and rotatable arm 80 is such that when said arm and the brush 79 are moved along the contact member 60 from the contact 66 to the contact 70, or from the contact 70 to the contact 66, cable is completely reeled on or unreeled from the cable reel drums 17 and 18. Likewise, the contacts 66, 67, 68, 69, 70, 71, 72, 73, and 74 are so spaced with respect to each other that the strength of the fields 53 and 54 is increased or decreased as the pull on the cables 15 and 16 tends to decrease or increase due to the increasing or decreasing diameter of the cable reel drums as cable is wound on or unwound therefrom.

The worm gear 90 is driven from a worm 97 formed integral with a horizontal shaft 98 extending transversely of the horizontal shaft 25. A worm gear 99 is keyed on the horizontal shaft 98 and meshes with and is driven from a worm 100 formed integral with the horizontal shaft 25. The reduction of the worm 100 and worm gear 99, and worm 97 and worm gear 90 is such as to cause the brushes 78 and 79 to completely short out or cut in the resistances 58 and 59 from the fields 53 and 54, respectively, when cable is completely wound or unwound from the cable reel drums 17 and 18 as has hereinbefore been stated.

It should be noted that the drive to the rotatable arm 80 is such that said arm is self-setting; as, for example, if the cable reel drums 17 and 18 are partially wound or unwound and said cable reel drums are turned by hand, the shaft 86 will be turned until the ear 95 abuts the stop 96 which will be when said drums are completely wound or unwound depending on the direction of rotation of said cable reel drums. Further, rotation of said drums in the same direction will cause no further rotation of the shaft 86. Likewise, if the cable reel drums 17 and 18 are turned in one direction and then reversed, the direction of movement of the rotatable arm will be reversed and stop when rotation of said cable reel drums is stopped or when said cable reel drums are completely wound or unwound. Thus when the rotatable arm 80 is once set it will require no further attention and will always be in the correct position no matter how the cable reel drums 17 and 18 are tampered with.

It may thus be seen that a new and improved cable reel and drive therefor has been provided which is so arranged as to provide an individual reel for each positive and negative cable and so as to carry a maximum amount of cable in a minimum amount of vertical height. The drive for each cable reel drum is such as to compensate for differences in length of the respective cables during winding or unwinding caused by fouling of the cables on obstacles in the mine. It may likewise be seen that a new and improved means of a simplified construction has been provided whereby the torque of the motor is substantially constant during stalling of the motor, when the mine locomotive is stopped, or during the initial winding or unwinding operation for any given amount of cable on the cable reel drums, and that means have been provided for progressively increasing or decreasing the field strength of the motor 20 step by step to provide a substantially constant cable tension therefor during the winding and unwinding operations, which means is so arranged as to compensate for the varying amounts of cable wound upon the respective cable reel drums and the increase or decrease in speed of the motor necessary to wind cable upon the cable reel drums at the speed of travel of the locomotive and provide a substantially uniform tension on the cables at all times while winding or unwinding and that this means is of a simplified construction and automatic operation so as to be operative and in a set position at all times during operation of the cable reel drums regardless of whether said cable reel drums have been turned by hand or by the motor 20.

While I have herein shown and described one form in which my invention may be embodied, it will be understood that the construction and arrangement of the parts may be altered without departing from the spirit and scope thereof. Furthermore, I do not wish to be understood as limiting myself to the specific form of construction illustrated herein excepting as specifically limited in the appended claims.

I claim as my invention:

1. In a cable reeling mechanism, a winding drum, a cable adapted to be wound thereon, a motor for rotatably driving said drum, said motor having an armature and shunt field and being driven by said reel as a generator during the unwinding operation and effecting tension on said cable during unwinding or stalling, and means for maintaining the torque of said armature substantially constant while said motor is operating as a motor or generator or is stalled comprising a resistance in series with said armature, a compensating field of less resistance value than said shunt field, the strength of said compensating field being adapted to vary inversely with the armature current, and a connection from said compensating field to said armature circuit.

2. In a cable reeling mechanism, a winding drum, a cable adapted to be wound thereon, a motor for rotatably driving said drum, said motor having an armature and shunt field and being driven by said reel as a generator during the unwinding operation and effecting tension on said cable during unwinding or stalling, and means for maintaining the torque of said armature substantially constant while said motor is operating as a motor or generator or is stalled comprising a resistance in series with said armature, a compensating field of less resistance value than said shunt field, the strength of said compensating field varying inversely with the armature current, and a resistance of less resistance value than the resistance value of said compensating field connected from said compensating field to said armature between said armature and said first mentioned resistance.

3. In an electric cable reeling mechanism, a cable reel drum, a cable adapted to be wound on said drum, a motor for driving said drum, said motor including an armature and a shunt field, and having driving connection with said drum whereby said motor drives said drum during the winding operation and is driven by said drum during the unwinding operation, said motor operating as a generator in series with the line during the unwinding operation and effecting tension on said cable during unwinding or stalling, and means for maintaining the torque of said armature substantially constant for certain predetermined amounts of cable on said drum while said motor is operating as a motor or generator, or is stalled, comprising a resistance in series with said armature, a compensating field of less resistance value than said shunt field, and means for automatically varying the strength of said compensating field inversely with the armature current comprising a resistance of greater resistance value than said compensating field in series with said compensating field, and a third resistance of less resistance value than said compensating field bridged from the positive side of the circuit to said compensating field to the positive side of the circuit to said armature.

4. In a cable reeling mechanism for an electric locomotive, a winding drum, a cable adapted to be wound thereon, a motor for driving said drum, said motor having an armature and shunt field and being driven by said reel as a generator during the unwinding operation and effecting tension on said cable during unwinding or stalling, and means for effecting a substantially constant torque on said armature while said motor is operating as a motor or generator or is stalled comprising a resistance in series with the positive side of said armature, a compensating field of less resistance value than said shunt field, the field strength of which is adapted to vary inversely with the armature current, and a connection from the positive side of said compensating field to the positive side of said armature circuit.

5. In an electric gathering locomotive, a reeling mechanism comprising a winding drum, a cable adapted to be wound thereon, a motor for driving said drum, said motor having an armature and shunt field and being driven by said drum as a generator during the unwinding operation and effecting tension on said cable during unwinding or stalling, and means for effecting a substantially constant torque on said armature while said motor is operating as a motor or generator or is stalled comprising a resistance in series with the positive side of said armature, a compensating field of less resistance value than said shunt field, the field strength of which is adapted to vary inversely with the armature current, and a resistance of less resistance value than the resistance value of said compensating field connected from the positive side of said compensating field to the positive side of the circuit to said armature between said armature and said first-mentioned resistance.

6. In an electric gathering locomotive, a reeling mechanism comprising a winding drum, a cable adapted to be wound thereon, a motor for driving said drum, said motor having an armature and shunt field and being driven by said drum as a generator during the unwinding operation and effecting tension on said cable during unwinding or stalling, and means for effecting a substantially constant torque on said armature while said motor is operating as a motor or generator or is stalled comprising a compensating field and means for varying the strength of said compensating field inversely with the armature current comprising a resistance in series with said compensating field of a greater resistance value than said compensating field, and another resistance of less resistance value than said compensating field bridged from the positive side of the circuit to said compensating field to the positive side of the circuit to said armature.

7. In an electric gathering locomotive, a reeling mechanism comprising a winding drum, a cable adapted to be wound thereon, a motor for driving said drum, said motor having an armature and a shunt field, and being driven by said drum as a generator during the unwinding operation and effecting tension on said cable during unwinding or stalling, and means for effecting a substantially constant torque on said armature while said motor is operating as a motor or generator or is stalled comprising a compensating field, a resistance in series with said armature, and means for varying the strength of said compensating field inversely with the armature current comprising a resistance of greater resistance value than said compensating field in series with said compensating field, and another resistance of less resistance value than said compensating field bridged from said compensating field to the circuit to said armature.

8. An electric gathering locomotive in accordance with claim 7, wherein means operable independently of said cable are provided for varying the strength of said shunt and compensating fields as cable is wound on or unwound from said cable reel drum for effecting a substantially uniform tension on said cable comprising a variable resistance connected in series with said shunt field and the negative line and another variable resistance connected in series with said compensating field and the negative line.

9. An electric gathering locomotive in accordance with claim 7, wherein means are provided for varying the strength of said shunt and compensating fields as cable is wound on or unwound from said cable reel drum for effecting a substantially uniform tension on said cable comprising a variable resistance connected in series with said shunt field and the negative line and another variable resistance connected in series with said compensating field and the negative line and wherein means operable independently of said cable are provided for alternately varying said resistance in series with said compensating and shunt fields.

10. An electric gathering locomotive in accordance with claim 7, wherein means are provided for increasing the strength of the shunt and compensating fields as cable is wound on said cable reel drum and decreasing strength of said shunt and compensating fields as cable is unwound from said cable reel drum comprising a resistance in series with said shunt field and the negative side of the line, another resistance in series with said compensating field and the negative side of the line, and wherein means operable independently of said cable are provided for cutting said resistances out of or into said shunt and compensating fields as cable is wound on or unwound from said cable reel drum.

11. An electric gathering locomotive in accordance with claim 7, wherein means are provided for increasing the strength of the shunt and compensating fields as cable is wound on said cable reel drum and decreasing the strength of said shunt and compensating fields as cable is unwound from said cable reel drum comprising a resistance in series with said shunt field and the negative side of the line, another resistance in series with said compensating field and the negative side of the line, and wherein means operable independently of said cable are provided for cutting said resistances out of or into said shunt and compensating fields as cable is wound on or unwound from said cable reel drum comprising a distributor unit driven from said cable reel drum motor.

12. In an electric gathering locomotive, a reeling mechanism comprising a winding drum, a cable adapted to be wound thereon, a motor for driving said drum, said motor having an armature and a shunt field and being driven by said drum as a generator during the unwinding operation and effecting tension on said cable during unwinding or stalling, and means for effecting a substantially constant torque on said armature while said motor is operating as a motor or generator or is stalled comprising a compensating field, a resistance in series with said armature, a connection from the positive side of said compensating field to the positive side of said armature whereby the strength of said compensating field may vary inversely with the armature current, and means for varying the strength of said shunt and compensating fields alternately step by step as cable is wound on or unwound from said winding drum comprising a variable resistance connected in series with said shunt field and another variable resistance connected in series with said compensating field and means driven by said motor for alternately varying said resistances.

13. An electric gathering locomotive in accordance with claim 12, wherein the means for alternately varying the resistances in the shunt and compensating fields comprises a rotatably driven member having two sets of alternately arranged contacts thereon, one set of contacts varying said resistance to said shunt field and the other set of contacts varying the resistance to said compensating field.

14. In a reeling mechanism, a winding drum, a cable adapted to be wound thereon, means for driving said drum comprising a motor including an armature, a shunt field and a compensating field, and means for effecting a uniform tension on said cable as cable is wound on or unwound from said drum comprising means for varying the torque of said motor corresponding to varying amounts of cable on said drum including a resistance in series with said shunt field, another resistance in series with said compensating field, and a distributor unit driven by said motor and adapted to cut the resistance out of or into said shunt and compensating fields step by step as cable is wound on or unwound from said cable reel drum, said distributor unit being self-setting so as to be in a set position with respect to the amount of cable on said drum when said drum is driven by said motor or revolved by hand.

15. In a reeling mechanism, a winding drum, a cable adapted to be wound thereon, means for driving said drum comprising a motor including an armature, a shunt field and a compensating field, and means for effecting a uniform tension on said cable as cable is wound on or unwound from said drum comprising means for varying the torque of said motor corresponding to varying amounts of cable on said drum including a resistance in series with said shunt field, another resistance in series with said compensating field, and a distributor unit driven by said motor and adapted to automatically cut said resistances out of or into said shunt and compensating fields step by step as cable is wound on or unwound from said drum, said distributor unit being self-setting so as to be in a set position with respect to the amount of cable on said drum when said drum is driven by said motor or revolved by hand, and means for driving said distributor unit from said motor and automatically setting said distributor unit at the proper position with respect to the amount of cable on said drum including a drive shaft directly connectible with said distributor unit, friction means for driving drive shaft from said motor and means for stopping rotation of said drive shaft when a predetermined amount of cable has been reeled on or unreeled from said drum.

16. In a reeling mechanism, a winding drum, a cable adapted to be wound thereon, means for driving said drum comprising a motor including an armature, a shunt field and a compensating field, and means for effecting a uniform tension on said cable as cable is wound on or unwound from said drum comprising means for varying the torque of said motor corresponding to varying amounts of cable on said drum including a resistance in series with said shunt field, another resistance in series with said compensating field, and a distributor unit driven by said motor and adapted to automatically cut said resistances out of or into said shunt and compensating fields step by step as cable is wound on or unwound from said drum, said distributor unit being self-setting so as to be in a set position with respect to the amount of cable on said drum when said drum is driven by said motor or revolved by hand, and means for driving said distributor unit from said motor and automatically setting said distributor unit at the proper position with respect to the amount of cable on said drum including a drive shaft directly connectible with said distributor unit, friction means for driving said drive shaft from said motor and means for stopping rotation of said drive shaft when a predetermined amount of cable has been reeled on or unreeled from said cable reel drum comprising means for causing said friction drive means to slip.

17. In a reeling mechanism, a winding drum, a cable adapted to be wound thereon, means for driving said drum comprising a motor including an armature, a shunt field and a compensating field, and means for effecting a uniform tension on said cable as cable is wound on or unwound from said drum comprising means for varying the torque of said motor corresponding to varying amounts of cable on said drum including a resistance in series with said shunt field, another resistance in series with said compensating field, and a distributor unit driven by said motor and adapted to automatically cut the resistance out of or into said shunt and compensating fields step by step as cable is wound on or unwound from said drum, said distributor unit being self-setting so as to be in a set position with respect to the amount of cable on said drum when said drum is driven by said motor or revolved by hand, and means for driving said distributor unit from said motor and automatically setting said distributor unit at the proper position with respect to the amount of cable on said drum including a drive shaft directly connectible with said distributor unit, friction means for driving said drive shaft from said motor, and means for stopping rotation of said drive shaft when a predetermined amount of cable has been reeled on or unreeled from said drum comprising a drive member freely rotatable with respect to said drive shaft, another member operatively connectible with said shaft and engageable with said drive member, yieldable means for engaging said second-mentioned member with said drive member, a fixed stop, and means on said second-mentioned member engageable with said fixed stop.

18. In a reeling mechanism, a winding drum, a cable adapted to be wound thereon, means for driving said drum comprising a motor including an armature and a shunt field, means for effecting a uniform tension on said cable as it is wound on or unwound from said drum comprising means for varying the torque of said motor corresponding to varying amounts of cable on said drum including a resistance in series with said shunt field, and a distributor unit driven by said motor and adapted to cut said resistance out of or into said shunt field as cable is wound on or unwound from said drum, said distributor unit being self-setting so as to be in a set position in accordance with the amount of cable on said drum when said drum is driven by said motor or revolved by hand.

19. In a reeling mechanism, a winding drum, a cable adapted to be wound thereon, means for driving said drum comprising a motor including an armature and a shunt field, means for effecting a uniform tension on said cable as it is wound on or unwound from said drum comprising means for varying the torque of said motor corresponding to varying amounts of cable on said drum including a resistance in series with said shunt field, a distributor unit driven by said motor and adapted to cut said resistance out of or into said shunt field as cable is wound on or unwound from said drum, said distributor unit being self-setting so as to be in a set position in accordance with the amount of cable on said drum when said drum is driven by said motor or revolved by hand, said means for self-setting said distributor unit comprising a yieldable drive from said motor to said distributor including a driving and driven member and means for stopping rotation of said driven member at a predetermined point irrespective of further rotation of said driving member.

20. In a reeling mechanism, a winding drum, a cable adapted to be wound thereon, means for driving said drum comprising a motor including an armature and a shunt field, means for effecting a uniform tension on said cable as it is wound on or unwound from said drum comprising means for varying the torque of said motor corresponding to varying amounts of cable on said cable reel drum including a resistance in series with said shunt field, and a distributor unit driven by said motor and adapted to cut said resistance out of or into said shunt field as cable is wound on or unwound from said drum, said distributor unit being self-setting so as to be in a set position in accordance with the amount of cable on said drum when said drum is driven by said motor or revolved by hand, and said means for self-setting said distributor unit comprising a friction drive from said motor to said distributor including a driving and driven member and a stop adapted to be engaged by said driven member for stopping rotation of said driven member at a predetermined point irrespective of further rotation of said driving member.

21. In a winding device, a winding drum, a cable adapted to be wound thereon, means for driving said winding drum comprising a motor including a shunt field, an armature shaft having an armature thereon, and a positive connection from said armature shaft to said winding drum, said motor acting as a means for restraining rotation of said winding drum when said cable is being unwound therefrom and also as a means for maintaining tension on said cable when connected to a fixed abutment remote from said winding drum and said winding drum is in a stalled position, and means for transmitting a constant torque to said armature shaft for any given amount of cable on said winding drum during the winding operation, the unwinding operation, and when said motor and winding drum are stalled and the end of said cable is connected to a fixed abutment remote from said winding drum comprising a compensating field connected in parallel with said shunt field and a resistance of less resistance value than said compensating field connected between said compensating field and said armature circuit.

22. In an electric gathering locomotive, a cable reel drum, a cable adapted to be wound on said cable reel drum, a motor for driving said cable reel drum, said motor including an armature and a shunt field, and having driving connection with said cable reel drum whereby said motor drives said cable reel drum during the winding operation and is driven by said cable reel drum during the unwinding operation, said motor operating as a generator in series with the line during the unwinding operation and effecting tension on said cable during unwinding or stalling, and means for effecting a substantially constant torque on said armature for certain predetermined amounts of cable on said cable reel drum while said motor is operating as a motor or generator, or is stalled, comprising a resistance in series with said armature and the positive side of the line, a compensating field so arranged that its field strength may vary inversely with the strength of the armature current, and means for automatically varying the strength of said compensating field inversely as the current flowing through said armature varies comprising another resistance in series with said compensating field and the positive side of the line, and a third resistance bridged from said compensating field circuit to said armature circuit.

23. In combination with an electric gathering locomotive, means for supplying power to said locomotive comprising a pair of winding drums, each of said drums having a cable connected thereto and adapted to be wound thereon and rotatable about a common vertical axis, a motor and a differential drive from said motor to said drums comprising a rotatable casing driven by said motor, a spur gear disposed coaxially of said casing and operatively connectible with one of said drums, another spur gear disposed coaxially of said casing and operatively connectible with the other of said drums, and a pair of meshing pinions supported in said casing, one of said pinions meshing with one of said spur gears and the other of said pinions meshing with the other of said spur gears.

24. An electric gathering locomotive in accordance with claim 23 wherein means are provided for effecting a uniform pull on said cables at all times during winding or unwinding of said cables from said cable reel drums, and when said cables are connected to the source of power and said locomotive and cable reel drums are stationary which comprises a shunt field for said cable reel drum drive motor having a resistance connected in series therewith, and means operable independently of said cable for varying said resistances as cable is wound on or unwound from said cable reel drums.

25. An electric gathering locomotive in accordance with claim 23 wherein means are provided for effecting a uniform pull on said cables at all times during winding or unwinding of said cables from said cable reel drums, and when said cables are connected to the source of power and said locomotive and cable reel drums are stationary which comprises a shunt field for said cable reel drum drive motor having a resistance connected in series therewith, and means operable independently of said cable connected in the drive from said motor to said cable reel drums and driven therefrom for varying said resistances as cable is wound on or unwound from said cable reel drums.

26. In a reeling mechanism, a cable reel drum, a cable adapted to be wound thereon, a motor, said motor including an armature and shunt field, and having driving connection with said cable reel drum whereby said motor drives said cable reel drum during the winding operation and is driven by said cable reel drum during the unwinding operation, said motor being driven as a generator during the unwinding operation, and effecting tension on said cable during unwinding or stalling, and means for effecting a substantially constant torque on said armature for certain predetermined amounts of cable on said cable reel drum while said motor is operating as a motor or generator, or is stalled, comprising a compensating field, and means for varying the strength of said compensating field inversely with the strength of said armature current comprising a resistance in series with said armature and the positive side of the line, another resistance of a greater resistance value than said compensating field in series with said compensating field and the positive side of the line, and a third resistance of a greater resistance value than said first-mentioned resistance bridged from said compensating field to the circuit to said armature.

27. A reeling mechanism in accordance with claim 26 wherein means operable independently of said cable are provided for automatically varying the torque of said motor as cable is wound on or unwound from said cable reel drum, for effecting a substantially uniform tension on said cable during the entire winding and unwinding operations.

28. A reeling mechanism in accordance with claim 26 wherein means are provided for automatically varying the torque of said motor as cable is wound on or unwound from said cable reel drum, for effecting a substantially uniform tension on said cable during the entire winding and unwinding operations comprising a resistance in series with the shunt field, another resistance in series with the compensating field and means operable independently of said cable for cutting said resistances into or out of said shunt and compensating fields during the unwinding and winding operations.

29. A reeling mechanism in accordance with claim 26 wherein means are provided for automatically varying the torque of said motor as cable is wound on or unwound from said cable reel drum, for effecting a substantially uniform tension on said cable during the entire winding and unwinding operations comprising a resistance in series with the shunt field, another resistance in series with the compensating field and means operable independently of said cable for cutting said resistances into or out of said shunt and compensating fields during the unwinding and winding operations comprising a distributor unit driven from the motor for driving the cable reel drum at such a speed as to progressively cut out the entire resistance from said shunt and compensating fields step by step during the winding operation and progressively cut said resistance into said shunt and compensating fields step by step during the unwinding operation.

WILLIAM W. SLOANE.